(12) United States Patent
Scholz et al.

(10) Patent No.: US 6,394,893 B1
(45) Date of Patent: May 28, 2002

(54) HYDRAULIC-ACTUATED BLADE ADJUSTER

(75) Inventors: Egbert Scholz, Rheda-Wiedenbrück; Stephan Berkemann, Paderborn, both of (DE)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 09/501,462

(22) Filed: Feb. 9, 2000

(30) Foreign Application Priority Data

Feb. 12, 1999 (DE) .......................... 199 05 835

(51) Int. Cl.[7] .................. A01D 75/18; A01F 12/16; A01F 21/00
(52) U.S. Cl. .................................................. 460/6
(58) Field of Search .................... 460/6; 56/10.27, 56/16.4 R, 16.4 A; 30/263, 264, 276; 248/562, 638; 83/303, 157, 554, 380

(56) References Cited

U.S. PATENT DOCUMENTS

| | | | | | |
|---|---|---|---|---|---|
| 2,351,868 A | * | 6/1944 | Morgan | ...................... | 83/303 |
| 3,081,659 A | * | 3/1963 | Theobald | .................... | 83/554 |
| 3,279,292 A | * | 10/1966 | Beard | ......................... | 83/380 |
| 3,730,036 A | * | 5/1973 | Báthory | ...................... | 83/554 |
| 3,855,888 A | * | 12/1974 | Gay | ............................ | 83/303 |
| 3,995,783 A | * | 12/1976 | Bertrand et al. | ............ | 241/222 |
| 4,343,212 A | * | 8/1982 | Hishinuma et al. | ........... | 83/303 |
| 4,679,473 A | * | 7/1987 | Hirata et al. | .................. | 83/157 |

FOREIGN PATENT DOCUMENTS

| | | |
|---|---|---|
| DE | 28 18 850 | 11/1979 |
| DE | 93 14 712 | 2/1994 |
| DE | 43 02 199 | 7/1994 |

* cited by examiner

*Primary Examiner*—Robert E. Pezzuto
*Assistant Examiner*—Árpád Fab Kovács
(74) *Attorney, Agent, or Firm*—Husch & Eppenberger, LLC; Robert E. Muir

(57) ABSTRACT

A hydraulically-actuated blade actuator selectively actuating the shear blades associated with a rotary cutter for cutting the harvested crop into small pieces prior to the baling or collecting process in agricultural harvesting machines. The hydraulic cylinders (12) are disposed within a parallelpiped block (14). A plurality of hydraulic cylinders (12) are arranged adjacent to one another in a block (14). A plurality of transversely extending borings (18, 19, 20) are arranged in the base region of each one of the blocks (14), the borings extending continuously through each of the assembled blocks such that each one of these borings (18, 19, 20) is connected to the space within a hydraulic cylinder (12) via a respective connecting bore (21, 22, 23). Each of the borings (18, 19, 20) is provided with an appertaining on-off valve (29, 30, 31) and an accumulator (32, 33, 34).

10 Claims, 4 Drawing Sheets

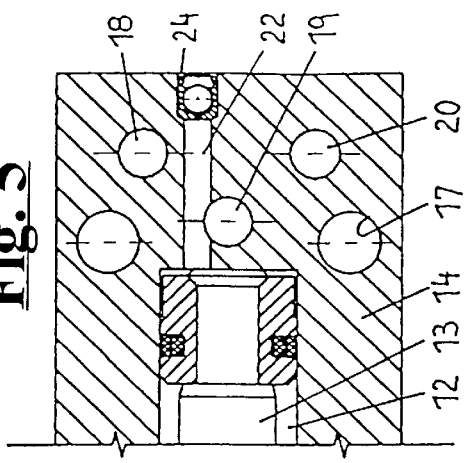
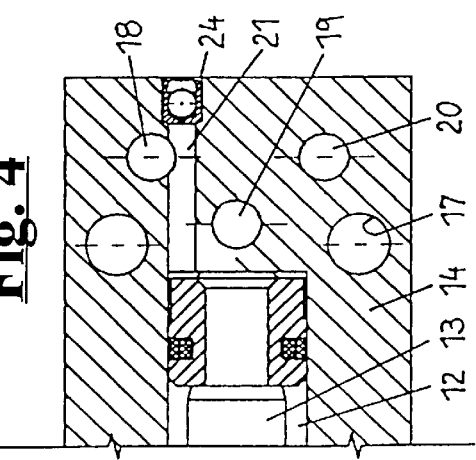
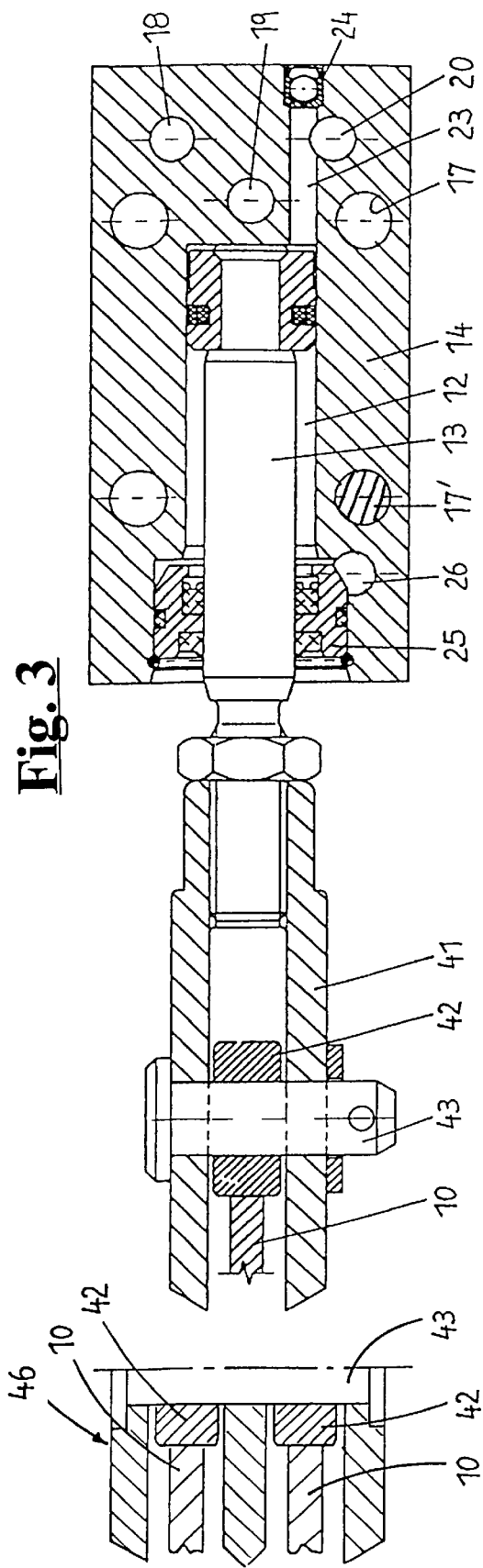

HYDRAULIC-ACTUATED BLADE ADJUSTER

BACKGROUND OF THE INVENTION

The invention relates generally to agricultural machines and, more particularly, to a hydraulic adjusting device, especially one for selectively actuating the blades used for cutting up the harvested crop in agricultural harvesting machines.

Various implementations of adjusting devices of this type that are used for differing purposes are already known. Thus, for example, a cutter device for harvested crops is described in DE 28 18 850 C2. This device is disposed in a feed channel of a tractor-drawn self-loading forage wagon. It comprises cutter blades which co-operate with the crop-advancing mechanism and which are active in the feed channel when in their working position. The cutter blades are held in their working position by means of a support device, and are moveable therefrom into a position where they are no longer effective. In this arrangement, the support device is formed by a controllable hydraulic adjusting device. One hydraulic adjusting device is associated with each cutter blade and the adjusting devices are coupled to the hydraulic plant in the tractor through the intermediary of a hydraulic accumulator. This implementation permits the cutter blades to retract automatically from the cutting zone should an overload occur due to the effects of a foreign body or some other form of obstruction. The blades automatically swing back into their working position once the cause of the disturbance has been removed. With this arrangement however, it is not possible to selectively alter the number of effective cutter blades so as to adjust the degree to which the crop is cut up in dependence on the particular crop being harvested and the usage to which it will be put.

In the cutter device comprising a plurality of pivotal cutter blades illustrated in DE 43 02 199 C2, the blades are moved into the cutting position by means of hydraulically controllable support means. The arrangement of blades as a whole, or a selectable number thereof, can be released from the support means so as to pivot into a non-cutting position by means of a control device. Here it is possible to make adjustments to allow for the actual harvesting conditions but the manufacturing costs are very high due to the complicated construction.

SUMMARY OF THE INVENTION

It is an object of the present invention to overcome one or more of the deficiencies described above.

Another object is to construct a hydraulic adjusting device or selectively actuating functional elements such as shear blades for example, in such a manner that a functionally effective solution having a simple and compact construction is obtained at low manufacturing cost.

In accordance with the invention there is provided a hydraulically-actuated blade actuating device for use on agricultural machines and including a plurality of blades each having a rear region, means for mounting said blades for pivotal movement as an entity and in differing numbers between a cutting position and a non-cutting position; a plurality of contact rollers each for engaging the rear region of at least one blade; means defining a block having a plurality of adjacent hydraulic cylinders disposed therein, the block having a plurality of borings operatively connected to the hydraulic cylinders for supplying hydraulic fluid thereto, each hydraulic cylinder being associated with each blade and having a piston rod engaged with a respective contact roller; and means for delivering hydraulic fluid to selected hydraulic cylinders to extend the respective piston rods thereby engaging the respective contact rollers with the rear region of the respective blades and moving said blades to the cutting position.

An implementation permits the spatial requirements of the device to be kept low by virtue of the compact construction. Various ways of activating the individual functional elements in the number required can be achieved through appropriate actuation of the existing hydraulic valves. The resultant wear and tear and the maintenance costs are very low due to the fact that only a few moveable components are involved. The simple implementation of the blocks in the form of a flange-like construction allows the whole adjusting device including the appertaining hydraulic valves to be pre-assembled.

In an embodiment of the invention, the following are provided: blades with a rear region which can pivot as an entity and in differing numbers into a cutting or a non-cutting position, a contact roller, adjacent hydraulic cylinders which are disposed in a block and connected via a through bore, each hydraulic cylinder being associated with each blade and having a piston rod that makes contact with the rear region of the associated blade via the contact roller; and borings which are arranged in the block such that each one of these borings is connected to the space within a hydraulic cylinder via a respective connecting bore.

These, and other objects and advantages of the present invention, will become apparent as the same becomes better understood from the following detailed description when taken in conjunction with the accompanying drawings.

BRIEF DESCRIPTION OF THE DRAWINGS

Reference is now made more particularly to the drawings which illustrate the best presently known mode of carrying out the invention and wherein similar reference characters indicate the same parts throughout the views.

FIG. 3 is a hydraulic cylinder and the connection thereof to a shear blade via a piston rod, along the section line III—III of FIG. 6.

FIG. 3a is an alternative form of the support part.

FIG. 4 is the base region of a hydraulic cylinder, along the section line IV—IV of FIG. 6.

FIG. 5 is the base region of a hydraulic cylinder, along the section line V—V of FIG. 6.

DETAILED DESCRIPTION

Figure 1:
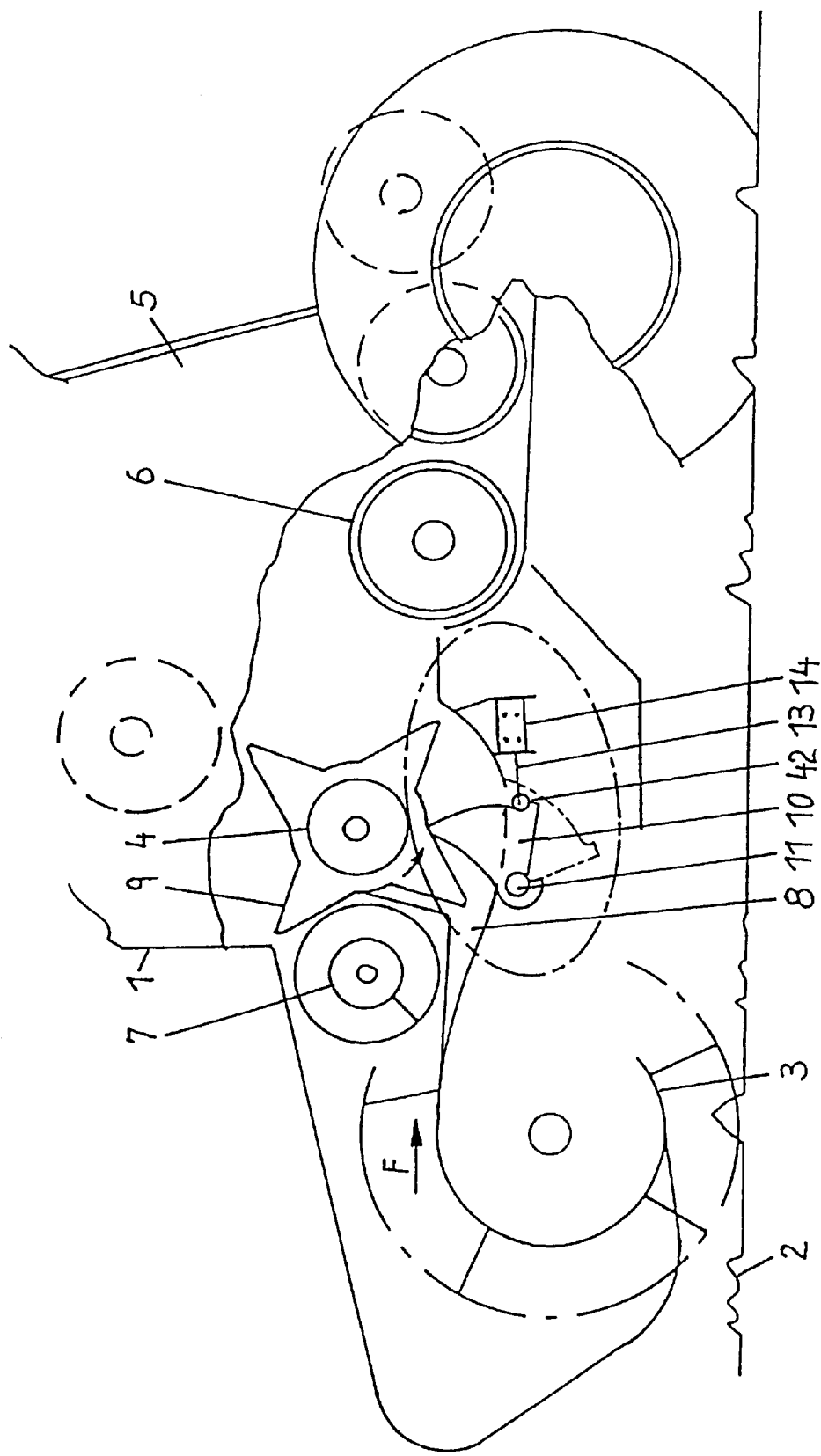
FIG. 1 is a side view of the pick-up and cutting region of a round baler.

In a round baler 1 that is partially illustrated in FIG. 1, mown crop lying on a field 2 is fed via a pick-up drum 3 and a rotary cutter 4 to a baling chamber 5 having a plurality of peripheral pressure rollers 6. The crop initially passes from the pick-up drum 3 below a feed drum 7 into a feed channel 8 and then to the rotary cutter 4 whose tine discs co-operate with knife blades disposed below the rotary cutter 4, or, with shear blades 10 shown in this embodiment, so as to cut the crop into small pieces. The mutually spaced shear blades 10 are disposed in a row, transversely to a direction F in which the crop is being fed, across the full width of the feed channel 8.

Figure 2:
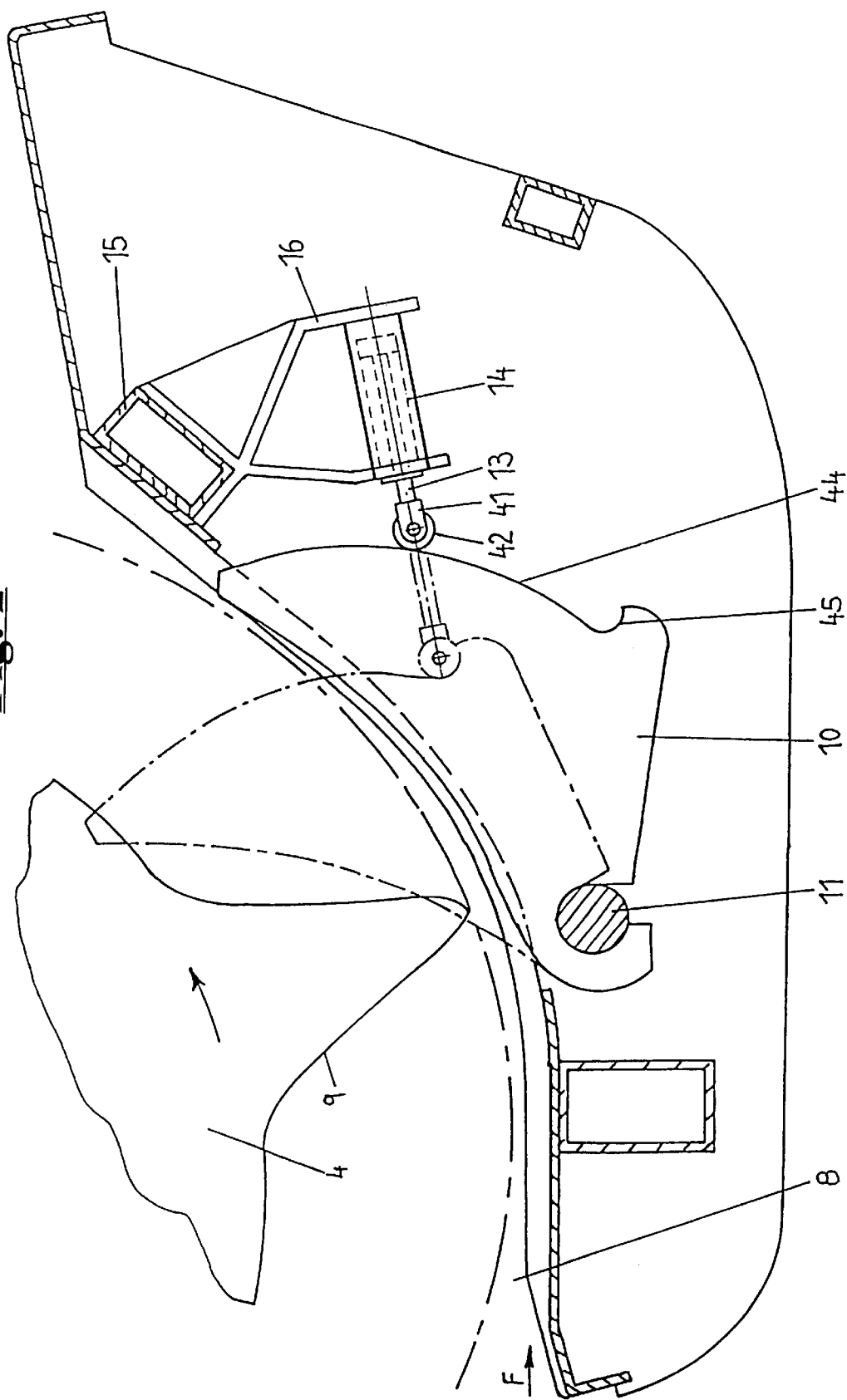
FIG. 2 is a schematic longitudinal section through the adjusting device for the shear blades.

The degree to which the crop is cut is determined by the number of effective shear blades 10 independence on the type and condition of the crop and the use to which it will be put. The larger the number of effective shear blades 10, the greater the degree to which the crop will be cut up. The shear blades 10 are disposed in pivotal manner on a shaft 11 extending continuously across the full width of the feed channel 8. The shear blades 10 are pivoted about the shaft 11, as a whole or in selected numbers, into a cutting or non-cutting position with the aid of a hydraulic adjusting device. In FIG. 2, the cutting position of the shear blades 10 is drawn in dash-dotted lines whereas the non-cutting position is drawn in solid lines. For the purposes of effecting the pivotal motion, hydraulic cylinders 12 are disposed in the rear region of the shear blades 10. The hydraulic cylinders 12 have piston rods 13 which cause the shear blades 10 to be moved into the required position. Advantageously, a double-action hydraulic cylinder 12 is associated with each individual shear blade 10. These hydraulic cylinders and their appertaining terminating and connecting lines are arranged within a block 14 having a cast, parallelpiped housing. The block 14 may contain a plurality of hydraulic cylinders 12 or each block 14 may contain a single hydraulic cylinder 12. In the latter event, a plurality of blocks may be fastened together to form a manifold in a manner hereinafter described.

Each block 14 incorporating the individual hydraulic cylinders 12 forms a separate module. A number of hydraulic cylinders 12 corresponding to the current type of application are disposed adjacent to one another in a block 14. In like manner, the width of the adjusting device can be varied and thereby adapted to the prevailing conditions of use by placing a plurality of mutually sealed blocks 14 together. The blocks 14 are attached behind the shear blades 10 to a bracket 16 which is connected to a cross-beam 15 in the round baler 1. The individual blocks 14 are connected together to form a single unit by means of a screwed connection. For this purpose, four transverse through bores 17 are provided in the blocks 14. Threaded rods having nuts attached to their ends are disposed in the bores 17, said nuts being seated on the outer walls of the blocks 14.

Figure 6:
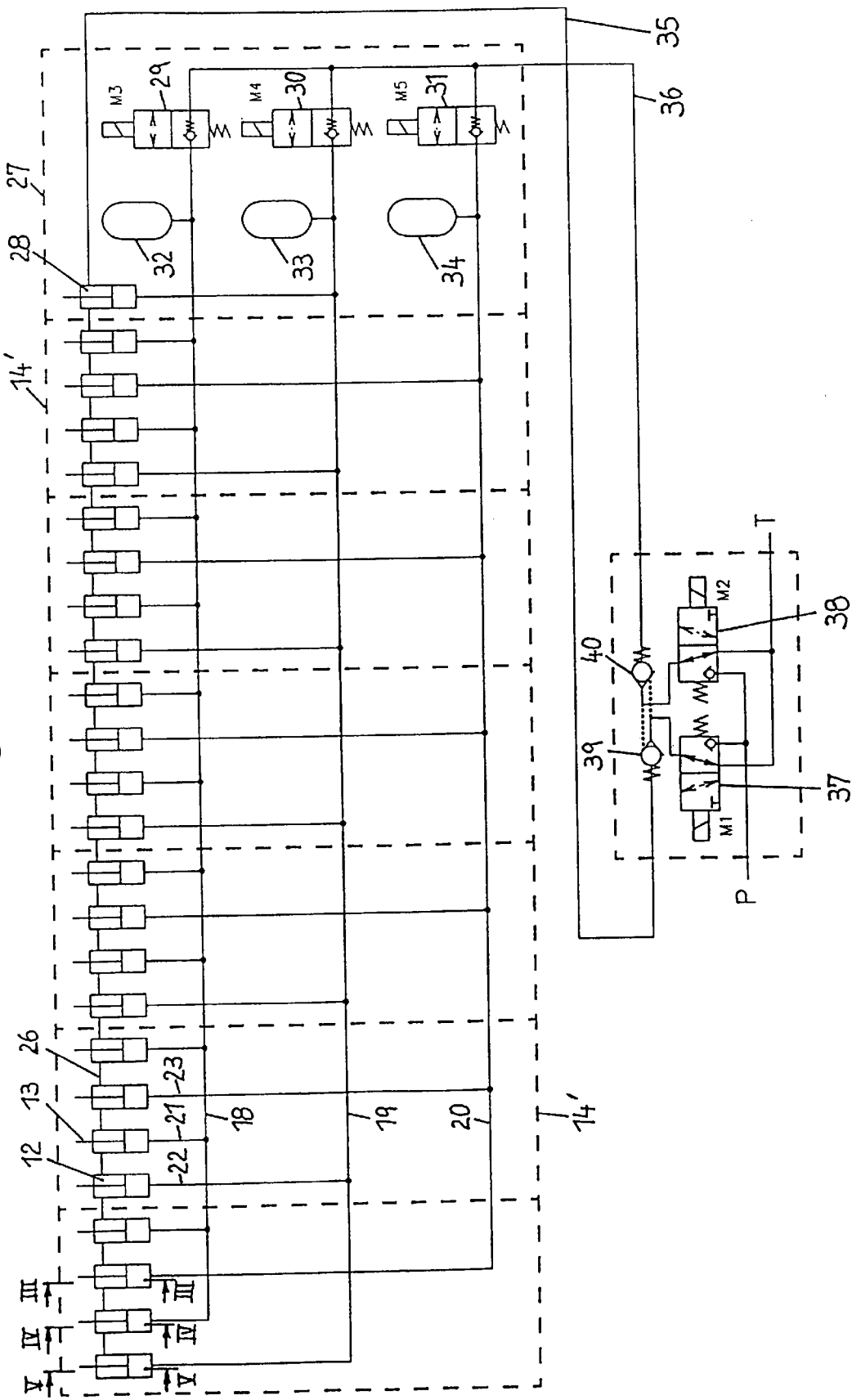
FIG. 6 is the hydraulic layout for the adjusting device.

In the embodiment schematically illustrated in FIG. 6, there are four adjacent hydraulic cylinders 12 in each block 14, these said blocks 14 being indicated by dashed lines 14'. Three borings 18, 19, 20 extending transversely of the longitudinal axes of the hydraulic cylinders 12 are disposed in the base region of each one of the blocks 14, said borings serving as pressure lines for supplying and removing the pressurized medium. These borings 18, 19, 20 are connected to appertaining individual connecting bores 21, 22, 23 which extend in parallel with the longitudinal axes of the hydraulic cylinders 12. They create the connection between the borings 18, 19, 20 and the spaces within the hydraulic cylinders. The connecting bores 21, 22, 23 are sealed by means of end seals 24 in the outer walls of the blocks 14. A further boring 26 for supplying or removing the pressurized medium is disposed in the vicinity of the cylinder head 25 of the hydraulic cylinders 12 in the block 14, said boring also extending transversely of the longitudinal axes of the hydraulic cylinders 12 through the whole of the block 14. A hydraulic cylinder 28 and three on-off valves 29, 30, 31 for selectively actuating the hydraulic cylinders 12, 28 are disposed in an end block indicated by dashed lines 27 in FIG. 6. End block 27 is in addition to the blocks 14 in the FIG. 6 embodiment. Three accumulators 32, 33, 34 are disposed in this block 27. Each of the three borings 18, 19, 20 serving as a pressure line is connected to an on-off valve 29, 30, 31 and to an accumulator 32, 33, 34 which serves to safeguard the respective hydraulic circuit from overloads. The borings 26 and the on-off valves 29, 30, 31 are connected via hydraulic lines 35, 36 to the main valves 37, 38. The two main valves 37, 38 are connected to a hydraulic pump P and an oil tank T. Whereas the hydraulic medium is applied to the individual hydraulic cylinders by means of the on-off valves 29, 30, 31, the common actuating arrangement for all of the hydraulic cylinders 12, 28 disposed in the individual blocks 14 and hence the arrangement responsible for the pivotal movement of all of the shear blades 10 between their cutting and their non-cutting positions is provided by the main valves 37, 38. Valves 29, 30, 31, 37 & 38 cooperate to provide control means for the delivery of hydraulic fluid to the hydraulic cylinders 12.

Many variations in the number of shear blades 10 co-operating with the rotary cutter 4 can be effected from an operator's compartment of a tractor by actuating the individual on-off valves 29, 30, 31 and the main valves 37, 38. Thus, over a very wide range, it is possible to match the degree to which the crop is cut up, to the type of crop, its condition and the use for which it is envisaged. The main valves 37, 38 have associated therewith releasable check valves which are actuated in correspondence with the position of the main valves 37, 38. The hydraulic medium is applied to the hydraulic cylinders 12, 28 by the main valve 37 such that all of the shear blades 10 will be pivoted into the non-cutting position. The actuation of the main valve 38 causes all of the shear blades 10 to be moved into the cutting position. Each piston rod 13 of the hydraulic cylinders 12, 28 is provided at its outermost end with a fork-shaped support part 41 which can be screwed into place and which serves for accommodating a contact roller 42. The support part 41 is thus releasably fastened to the piston rod 13 via the screw connection and is adjustable in the axial direction.

A pin 43 upon which the contact roller 42 is rotatably mounted is arranged between the two side arms of the forked support part 41. As an alternative, the support part 41 (FIG. 3a) may be in the form of a twin fork arrangement so that two shear blades can be supported or actuated in each block 14. In the non-cutting position of the shear blades 10, the contact rollers 42 rest on the curved backs 44 of the shear blades 10 and thereby support them. When the piston rods 13 move out, the shear blades 10 are pivoted about the shaft 11 into a cutting position. It an end position, i.e. the position where the piston rods are extended to the maximum, the contact roller 42 thereby comes to rest in a retention trough 45 located in the lower part of the shear blade 10. A reverse pivoting of the shear blade 10 into a non-cutting position is effected by the inward movement of the piston rod 13. The contact rollers 42 thereby release the shear blades 10 and these automatically swing down under their own weight about the shaft 11 into the non-cutting position.

Referring again to FIG. 6, there are two operating modes of the whole device: a first mode for shifting the shear blades 10 into the feed channel 8 and holding them there, and a second mode for releasing the shear blades 10 out of the feed channel 8. A special problem is that in the first mode it is possible, by a simple hydraulic arrangement, that the number of blades to be shifted can be alternatively selected. For operating the shear blades 10 in the first mode (shifting into the feed channel 8), there are three conduits (18, 19, 20), which are selectively supplied by valves (29, 30, 31). The conduits 18, 19, 20 extend through the entire width of the assembled blocks 14'. The width of the assemblage is achieved by joining a plurality of blocks 14 side by side, six of them shown in dashed lines in FIG. 6. A shifting head is in end block 27, also shown in dashed lines, and containing valves (29, 30, 31). Each block 14 contains a plurality of hydraulic cylinders 12, each being connected to one of the conduits. If the respective conduit 18, 19 or 20 gets pressure, the hydraulic cylinder coupled thereto is driven out. So in each block there is a plurality of hydraulic cylinders, each being connected with one of the plurality of conduits. Because the conduits of the plurality of blocks 14 are aligned with each other, it is possible to work all hydraulic cylinders over the full width of the assemblage which are coupled to this one conduit. If more that one conduit is operated (i.e. pressurized) more than one hydraulic cylinder is driven out in each single block, and if all conduits are operated, all hydraulic cylinders of one block are driven out.

To make it possible that the single blocks 14 are coupled together in one assemblage, bolts (one of which is shown at 17' in FIG. 3) extend through the bores 17 of each single block 14 and fix the blocks 14. Hence the blocks 14 are aligned on the bolts which, in turn, are secured by a nut at the end of each bolt. Bores 17 have no impact on the hydraulic function of the whole device; bore 17 is only for mechanically fastening a plurality of blocks 14 into an assemblage.

During the function of boring 26 in the first operating mode (shifting the shear blade 10 into the feed channel 8), the hydraulic fluid which is at the tank-side of each cylinder chamber is drained so that the cylinder can move outwardly. This draining in the first operating mode is done through the conduit which is made by aligning the plurality of borings 26 in each single block 14. In the second operating mode, shear blades 10 are moved out of the feed channel 8; therefore all cylinders which were operated to keep their respective blade extended into the feed channel 8 are moved backwards. By pressurizing the conduit formed by borings 26, a recess (i.e. withdrawal) of all cylinders over the full width of the assemblage is achieved.

The conduit formed by bores 26 of each block 14 has a double function: draining the hydraulic fluid in the first operating mode, and moving back the cylinders by pressurizing them in the second operating mode. Accordingly, bore 26 plays an important role in the hydraulic function of device 14'.

The embodiment of the invention has been explained on the basis of a round baler, but nevertheless, it can be employed in corresponding manner in any type of harvesting machine such as a big square baler. While a preferred embodiment of the invention has herein been illustrated and described, this has been done by way of illustration and not limitation, and the invention should not be limited except as required by the scope of the appended claims.

We claim:

1. A hydraulically-actuated blade actuating device for use on agricultural machines and including:

a plurality of blades each having a rear region, means for mounting said blades for pivotal movement as an entity and in differing numbers between a cutting position and a non-cutting position;

a plurality of contact elements each for engaging the rear region of at least one blade;

means defining a block having at least one hydraulic cylinder disposed therein, the block having a plurality of borings of which one is operatively connected to said hydraulic cylinder for supplying hydraulic fluid thereto, each hydraulic cylinder being associated with each blade and having a piston rod engaged with a respective contact element; and control means for delivering hydraulic fluid to selected hydraulic cylinders to extend the respective piston rods thereby engaging the respective contact elements with the rear region of the respective blades and moving said blades to the cutting position.

2. A device in accordance with claim 1, wherein each of the borings is provided with an appertaining on-off valve and an accumulator.

3. A device in accordance with claim 2, including a plurality of main valves, and wherein the bores and the on-off valves are connected via a plurality of hydraulic lines to the plurality of main valves.

4. A device in accordance with claim 1, wherein the means defining a block includes a plurality of block modules arranged adjacently, and including means for releasably connecting the block modules to one another.

5. A device in accordance with claim 4, wherein the block modules are pre-assembled by means of a bolt connection.

6. A device in accordance with claim 4, wherein the block modules incorporate a plurality of transverse through bores containing a plurality of threaded rods, each threaded rod having an end with a nut thereon.

7. A device in accordance with claim 4, further including a cross beam; a bracket mounted on the cross beam and carrying the block modules in a position adjacent the blades.

8. A device in accordance with claim 2, further including an end block, the on-off valves and the accumulators being associated with the end block.

9. A hydraulic adjusting device including: a plurality of selectively actuating blades for cutting harvested crops in agricultural harvesting machines, said blades being pivotal as an entity and in differing numbers into a cutting and a non-cutting position, a plurality of adjacent hydraulic cylinders which are disposed in a block, each hydraulic cylinder being associated with an associated one of the blades, each hydraulic cylinder having a piston and a piston rod which makes contact with a rear region of the associated blade via a contact roller;

a plurality of borings arranged in the block such that one of these borings is hydraulically connected to a space within the hydraulic cylinders; and the plurality of borings being hydraulically connected together via a transverse bore.

10. An agricultural machine including a rotary cutter located at a feed channel, a shearing blade cooperative with the rotary cutter, and a hydraulically-actuated blade actuating device which includes: a plurality of blocks, wherein each of the plurality of blocks have at least one hydraulic cylinder and at least three bores disposed therein, each hydraulic cylinder being hydraulically connected with two of said at least three bores, and valve means for selectively supplying and releasing hydraulic fluid by said two of the at least three bores which are operatively connected with said hydraulic cylinders whereby the shearing blade is selectively movable between a position in the feed channel and a position removed therefrom.

* * * * *